Jan. 4, 1938.   R. R. CANDOR ET AL   2,104,383
REFRIGERATING APPARATUS
Filed May 20, 1937   4 Sheets-Sheet 1

INVENTORS
R. R. Candor  D. F. Alexander
BY
ATTORNEYS

Jan. 4, 1938.   R. R. CANDOR ET AL   2,104,383

REFRIGERATING APPARATUS

Filed May 20, 1937        4 Sheets-Sheet 2

INVENTORS
R. R. Candor, & D. F. Alexander
BY
[signature]
ATTORNEYS

Patented Jan. 4, 1938

2,104,383

UNITED STATES PATENT OFFICE 2,104,383

REFRIGERATING APPARATUS

Robert R. Candor and Donald F. Alexander, Dayton, Ohio, assignors to General Motors Corporation, Dayton, Ohio, a corporation of Delaware Application May 20, 1937, Serial No. 143,843

11 Claims. (Cl. 62—117)

This application relates to refrigerating apparatus and more particularly to air conditioning for railway cars or the like.

An object of this invention is to provide an electrically energized air conditioning system, in which the electrical energy is derived from the battery of the car while A. C. or relatively high voltage current is not available, and is derived from an A. C., or relatively high voltage D. C. current while such current is available, in such a manner that energy derived from the A. C., or relatively high voltage current may be used to charge the battery whether air conditioning is required or not.

Further objects and advantages of the present invention will be apparent from the following description, reference being had to the accompanying drawings, wherein a preferred form of the present invention is clearly shown.

Figure 4:
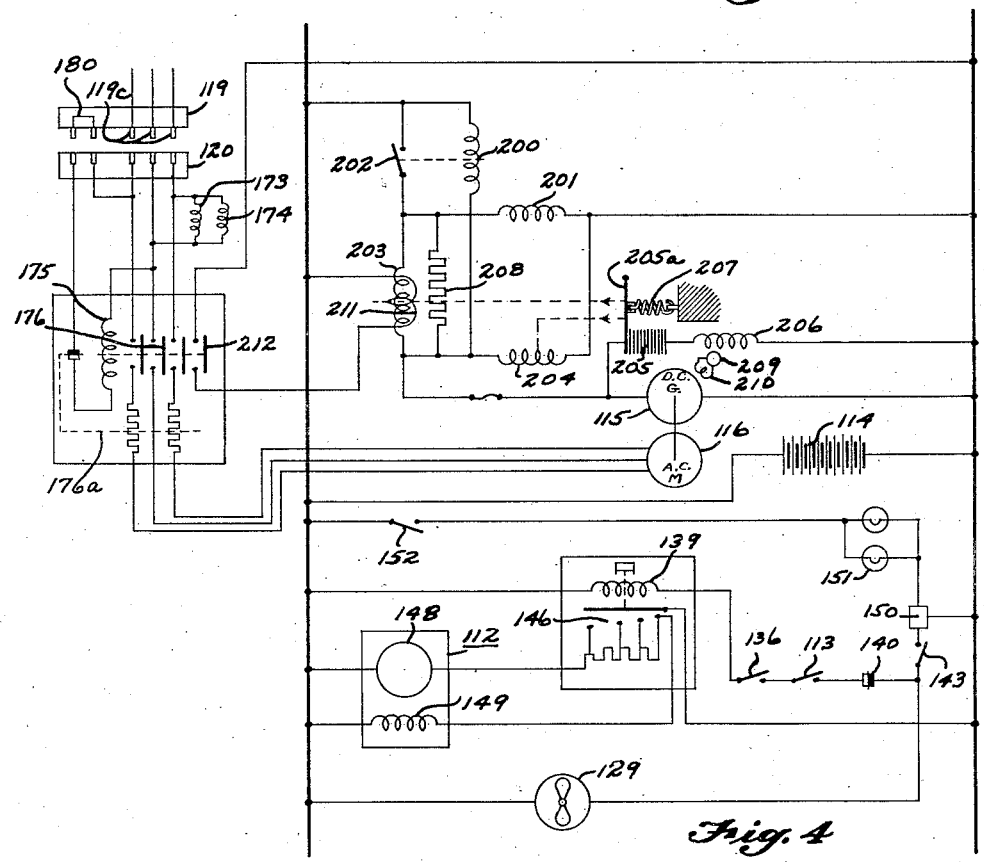
Fig. 4 is a wiring diagram, in simplified form, for use with the system shown in Fig. 3.
Figure 4A:
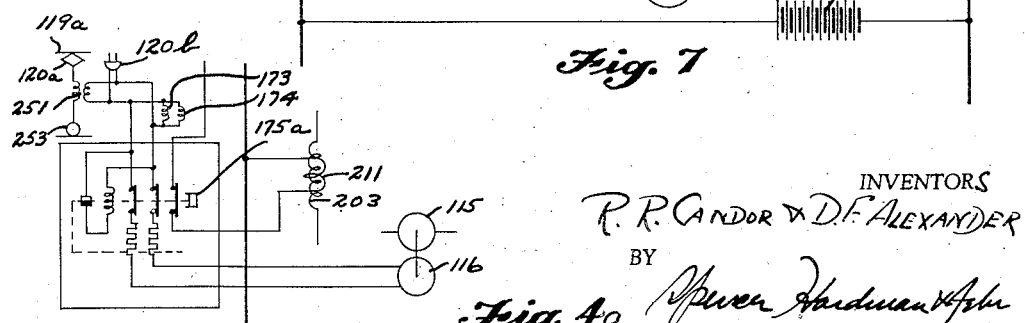
Fig. 4a shows a modification of a portion of Figs. 4 or 6 to 10 inclusive to be used on electrified lines.

Figs. 6 to 10 inclusive show wiring diagrams to be substituted in the wiring diagram shown in Fig. 4, or Fig. 4 as modified by Fig. 4a and indicate different ways of governing generator output to balance the same with A. C. motor capacity; and Fig. 11 is a diagrammatic showing of a shiftable brush commutator for a generator which may be used with this invention.

Railway cars, or other vehicles, have been provided heretofore with generating systems for charging the battery on the vehicle, and have been provided with refrigerating apparatus being driven by a motor energized from the battery, or the generating system, while the vehicle is in motion and have also been provided with an A. C., or relatively high voltage D. C., motor for driving the compressor of the refrigerating system while the vehicle is standing at the station, the arrangement being such that the A. C., or relatively high voltage D. C., motor provides surplus energy for charging the battery. However, this charging operation has been made dependent on the operation of the compressor, so that battery charging could be obtained from the station current only while the compressor operates. According to this invention, however, it is possible to retain all of the advantages of the previous devices and at the same time provide for the charging of the battery independently of the operation of the compressor with substantially the same major equipment heretofore used.

Figure 1:
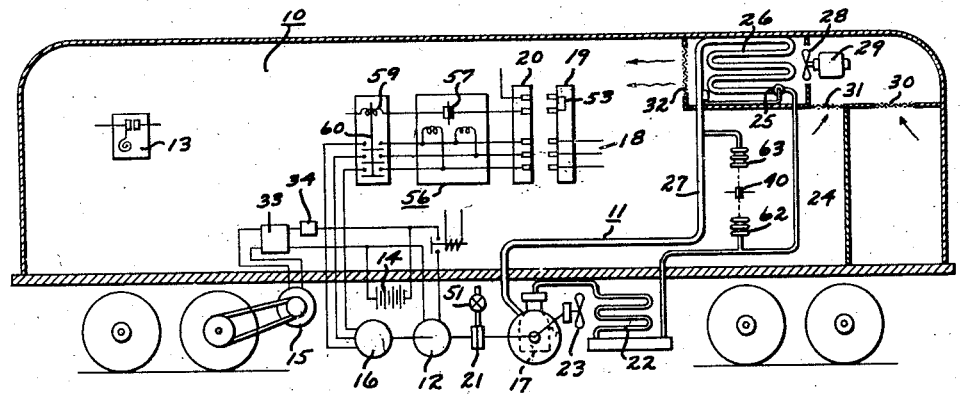
Fig. 1 is a diagrammatic representation of a car having one form of the invention.
Figure 2:
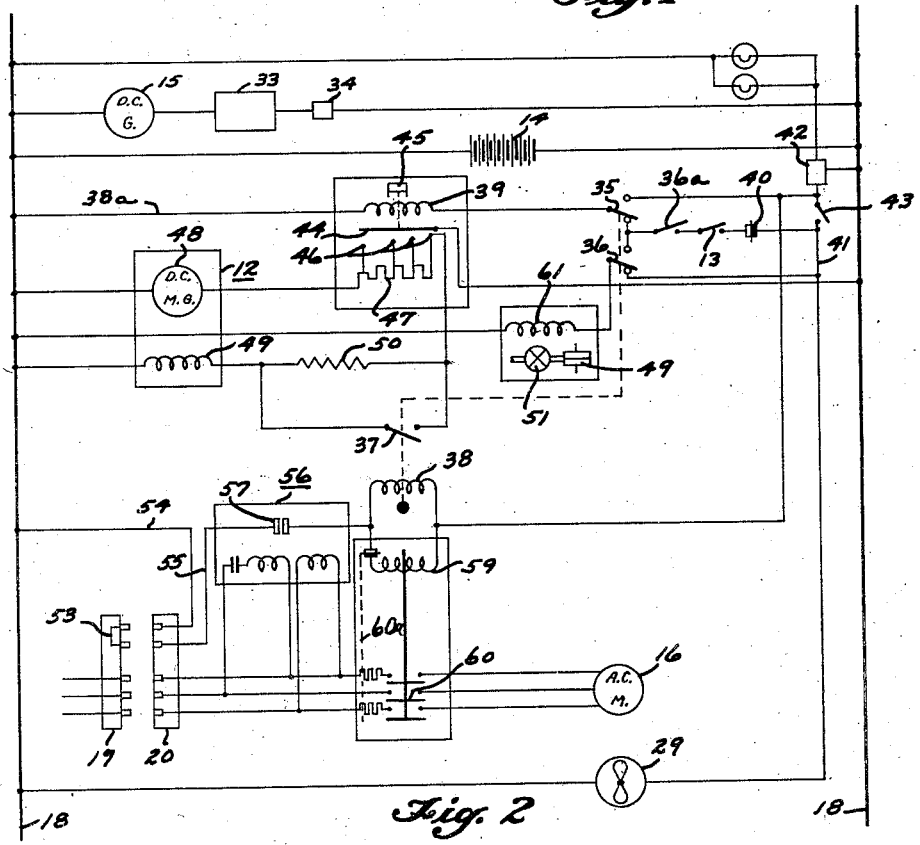
Fig. 2 is a wiring diagram in simplified form, for use with the system shown in Fig. 1.
Figure 2A:
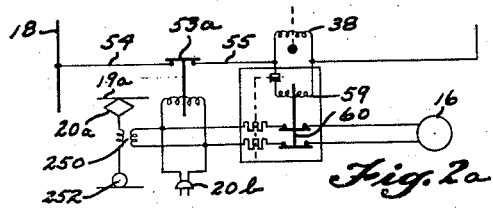
Fig. 2a shows a modification of a portion of Fig. 2 to be used on electrified lines.

Figs. 1 and 2 show a system for use with station current and Fig. 2a shows how Fig. 2 may be modified for use on electrified lines. A railway car, or other vehicle 10 is provided with an air conditioning, or refrigerating system 11, driven by a relatively low D. C. dynamoelectric machine or motor-generator 12 under the control of a thermostat, or other air conditioning responsive instrument, 13. The motor 12 is energized either by the battery 14, or by the axle-driven dynamoelectric machine or generator 15, or both. When the car stands at the station, or when A. C. or relatively high voltage D. C. current is available on an electrified line, the refrigerating system may be energized by an A. C., or relatively high voltage D. C., dynamoelectric machine or motor 16 which drives the compressor 17 and the D. C. motor 12. The motor is energized from station current source 18 by the insertion of plug 19 in the receptacle 20 or may be energized by the connection of a trolley-like connection 20a to the wire 19a on an electrified line as indicated at Fig. 2a. Where the system of Fig. 2a is used a station plug 20b may be provided for use with station A. C. current on portions of the line which are not electrified.

The arrangement of the foregoing system is such that the axle-driven generator 15 charges the battery 14 and runs the D. C. motor 12 as a generator all the time A. C. current is available. The clutch 21, between the motor 12 and compressor 17, is controlled by the thermostat 13 when stand-by current is available to engage the compressor when refrigeration is required and to disengage the compressor when refrigeration is not required. The motor 16 runs all the time that A. C. current is available, and operates the motor 12 as a generator to charge the battery 14, and the compressor 17 is engaged only when refrigeration is required. When the car runs, or when A. C. is not available, the thermostat 13 controls motor 12 to start and stop it. The clutch 21 is engaged all the time that A. C. current is not available due to the disconnection of the plug 20 or the trolley-like connection 20a. The motor 12 thus drives the compressor whenever required by thermostat 13.

The foregoing operation is, in more detail, accomplished as follows: The refrigeration cycle includes a compressor 17 which discharges into a condenser 22, which may be cooled by the fan 23 driven simultaneously with the compressor 17. Liquid refrigerant flows from the condenser 22, through the pipe 24, past the thermostatic expansion valve 25 through the evaporator 26 and back to the compressor 17 through the line 27. Air is blown over the evaporator 26 by means of the fan 28 driven by the motor 29, fresh air entering through the filter 30, and recirculated air entering through the grilled opening 31, the cooled air being discharged, through the grille 32, into the compartment to be cooled. The thermostat (or any other instrument, such as a humidostat, wet bulb thermostat or effective temperature responsive control) controls the operation of the compressor 17 to start the compressor when refrigeration is required and to stop the compressor when refrigeration is not required.

While the car runs, or when A. C. current is not available the axle-driven generator 15 charges the battery 14 under the control of a voltage and current controller 33 and a reverse current relay 34. The switches 35, 36 and 37, which are under the control of coil 38 are in their lower position when the coil 38 is unenergized, due to the absence of A. C. current. Under such conditions, control current can flow through the wire 38a through the starter coil 39, switch 35, hand control switch 36a, thermostatic switch 13 and head pressure controller switch 40 to the line 41 which is under the control of the voltage regulator 42 and hand switch 43. The starter coil 39, when energized lowers the contact 44 under the control of dash-pot 45 so that the contacts 46 are progressively engaged gradually to throw out the resistance 47 across the armature 48 of the D. C. motor 12. At the same time the field 49 of the motor 12 is energized in series with the resistance 50 so that the motor-generator 12 operates as a motor, being started and stopped in response to thermostatic conditions. The clutch 21 is engaged all of this time because the solenoid valve 51 is not energized and the air valve engages the clutch under these conditions. The blower motor 29 operates all of the time that air conditioning is desired by the closing of the hand switch 43.

When the car stands at the station, the plug 19 may be inserted into the receptacle 20. Likewise, when the car is on an electrified line, the trolley-like connection 20a is connected to the overhead wire 19a (Fig. 2a). When this occurs, the jumper 53 (Fig. 2) or the relay switch 53a (Fig. 2a) bridges the lines 54 and 55. If the station current is of the correct polarity, the rotation relay 56 (which is used only when the number of phases require it) closes the contacts 57 to energize the solenoid 38 and the starter solenoid 59. The energization of the solenoid 59 closes the contacts 60 and starts the A. C. motor 16. The energization of the coil 38 places the switches 35, 36 and 37 in their upper positions. This causes the solenoid 39 to be energized independently of the thermostat 13, thus placing the motor-generator 12 across the battery line so that it may act as a generator driven by the A. C. motor 16. The closing of the switch 37 shunts the resistance 50, thus changing the field 49 to a generating field. The energization of the solenoid 61 is now under the control thermostat 13 because the switch 36 is in its proper position, causing the clutch 21 to be engaged and disengaged in response to the opening and closing of thermostat 13 to start the compressor when refrigeration is required and to stop the compressor when refrigeration is not required.

The pressure switch 40 is a safety feature. This switch may be opened by a bellows 62 responsive to the head pressure of the compressor, the switch being open only when there is excessive head pressure. This switch may also be opened when there is excessively low back pressure under the control of bellows 63. The two bellows may open the switch independently of each other.

Figure 3:
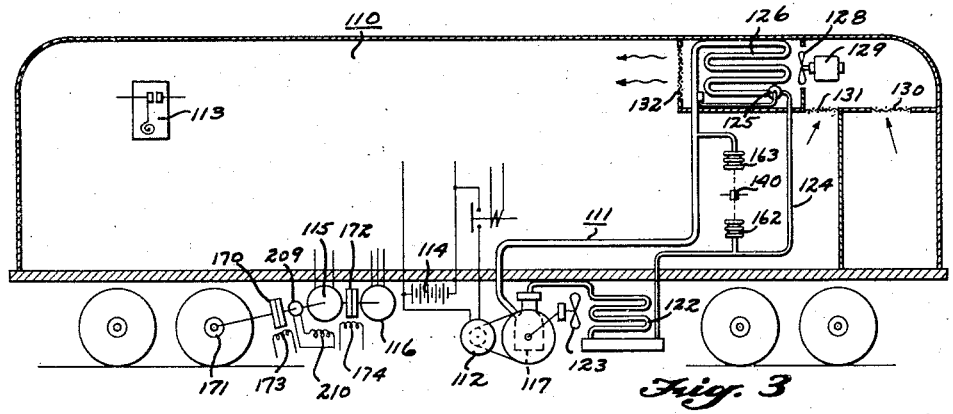
Fig. 3 is a diagrammatic representation of a car having a modified form of the invention.

In the modification shown in Figs. 3 and 4, the car 110 is provided with a refrigerating system 111 substantially similar in operation to the system described previously, and wherever numerals are used higher by 100 than those used in Figs. 1 and 2, it is intended to signify that the parts correspond in construction and function as nearly as possible. Thus a compressor 117 discharges into the condenser 122. Liquid refrigerant flows through line 124 past the thermostatic expansion valve 125, evaporator 126 and back through the line 127 to the compressor 117. A fan 123 is provided for the condenser. A fan 128 is driven by a motor 129 to circulate fresh air from filter 130 and recirculated air from grille 131 past the evaporator 126 through the grille structure 132. The compressor 117 is driven by a D. C. motor 112 under the control thermostatic switch 113. An axle-driven generator 115 charges the battery 114 while the car is running under the control of a voltage and current controller and a reverse current relay.

Fig. 4a shows how the system of Fig. 4, (or the systems of Figs. 6 to 10) may be modified for use with electrified lines showing the trolley-like connection and the station plug similarly to Fig. 2a. In Figs. 2a and 4a the source of A. C. on the electrified line is likely to be very high voltage and therefore transformers 250 and 251 may be used, to be energized by the circuit from the wires 19a, 119a to the wheels 252 and 253. This provides A. C. current of reduced voltage to the A. C. motor.

In the modification shown in Figs. 3, 4, and 4a, the axle-driven generator 115 is adapted to be driven by an A. C., or relatively high voltage D. C., motor 116 when the car is at the station or is on an electrified line. The arrangement is such that when A. C. current is made available by inserting the plug 119 into the plug 120, or by connecting trolley-like connector 120a to wire 119a or plug 120b to a plug at a station, the motor 116 drives the generator 115 all the time, thus charging the battery 114, and if the thermostat 113 requires it, also driving the motor 112 and the compressor 117 to provide refrigeration. As indicated in Fig. 3, the generator 115 is provided with an electro-magnetic (or otherwise controlled) clutch 170 so that the generator 115 is disengaged from the axle 171 whenever A. C. current is available and the solenoid 173 is energized, and the electro-magnetic clutch 172 is caused to engage whenever A. C. current is available and the solenoid 174 is energized. The construction of clutches 170 and 172 may be similar, except that the clutch 170 is caused to be disengaged when its controller 173 is energized and the clutch 172 is caused to be engaged when its controller 174 is energized. The operation of these clutches is such that the motor 116 is engaged with the generator 115 whenever A. C. current is available and disengaged when the A. C. source is disconnected. The axle clutch 170 is disconnected when A. C. current is made available so that the generator 115 may be driven by the motor 116, and this clutch is engaged when A. C. current is disconnected. When the plug 119 is inserted in the receptacle 120, or the connector 120a is energized the controllers 173 and 174 are energized to operate the clutches as heretofore described. In addition, the solenoid 175 is energized to close the starter contacts 176. The prongs of the jumper 180 are made shorter than the prongs 119c, thus insuring that good contact is made on the power lines before the starter is energized, and insuring operation of the clutches ahead of the A. C. motor. In Fig. 4a, the motor starter may be provided with time delay device 175a to insure operation of the clutches before starting the A. C. motor. The refrigerating system is under the control of the thermostat 113 which is adapted to energize the starter solenoid 139 whenever the hand switch 136 and the head pressure and low pressure switch 140 are closed. The energization of the solenoid 139, in response to refrigeration demand, progressively closes the contacts 146 to cause current to flow through the armature 148 of the D. C. motor 112. At the same time, the motor field 149 is energized. The blower motor 129 and the compressor motor 112 are under the control of switch 143. The generator 115 may be provided with any type of voltage and current controller to connect the same with the battery 114 when the voltage across the armature of the generator is suitable for charging the battery and for disconnecting the same when the current reverses. Thus a coil structure 200 may be provided, which, by magnetic reaction with the potential coil structure 201, closes the switch 202 when the voltage across the armature of the generator 115 is suitable for battery charging. This operation places the generator in circuit with the battery. Immediately upon the closing of the switch 202 the coil 203 is placed in the circuit. The coil 203 and the potential coil 204 independently regulate the resistance 205 in series with the field 206 by magnetic reaction with arm 205a in accordance with the normal requirement of battery charging. Coil 203 also serves to hold shut the switch 202 during the battery charging period. The resistance 205 governs the strength of the field 206 which may be the generator field or the generator exciter field, and hence the generator output is regulated by the coils 203 and 204. Coil 204 limits the maximum voltage of the generator at any time, which value may be adjusted by a resistor in series with the coil 204 (not shown) or by an adjustable retaining spring device 207 cooperating with arm 205a. Coil 203 responds to all or a portion of the generator output current, and is magnetically connected to the resistance 205 so that generator current in excess of a predetermined value through the coil 203 increases the value of the resistance 205 independently of the requirements of coil 204. This action limits the generator output current to any definite value regardless of maximum voltage adjustments. This may be accomplished by lost motion devices or other mechanical means between the armatures of coils 203 and 204 and the arm 205a.

When the generator output voltage decreases below that of the battery, the current through switch 202 and coil 203 reverses. Coil structure 203 opens switch 202 by magnetic reaction with potential coil structure 201 preventing damage to the generator armature. An adjustable resistance 208 may be placed in parallel with the coil 203. This resistance 208 may be manually adjustable. This resistance 208 is used, in conjunction with coil 203, to regulate the total generator output current charging the battery.

The generator 115 may be of the type that produces current in the same direction regardless of the direction of rotation of the generator armature. This may be accomplished either by providing the usual brush shifting device, shown in Fig. 11, or it may be accomplished by providing an exciter, the armature 209 of which reverses in rotation with reversal of generator armature rotation. The field 206 may be the exciter field. The exciter energizes the field 210 of the generator 115. If the usual brush shifting device is used, as indicated in Fig. 11, the field 206 may be the field for the generator 115. In either case, the resistance 205 indirectly governs the output of the generator 115 to provide the proper current and voltage for the battery 114.

Means are provided for altering or biasing the control of generator 115 when A. C. current is made available to balance the power demands of generator 115 with the power capacity of the motor 116. In the modification shown in Fig. 4, this is accomplished by providing a biasing coil 211 adjacent the coil 203, the construction being such that the coil 211 is energized when the plugs 119 and 120 are joined. When this biasing coil 211 is energized, the pull of coil 203 upon the resistance 205 is altered, preferably to increase the resistance and thus reduce the field strength 206 which in turn reduces the current output of the generator 115. The energization of the coil 211 is made dependent on the energization of the starter coil 175 which closes the contacts 212 thus placing the coil 211 across the battery.

Figure 6:
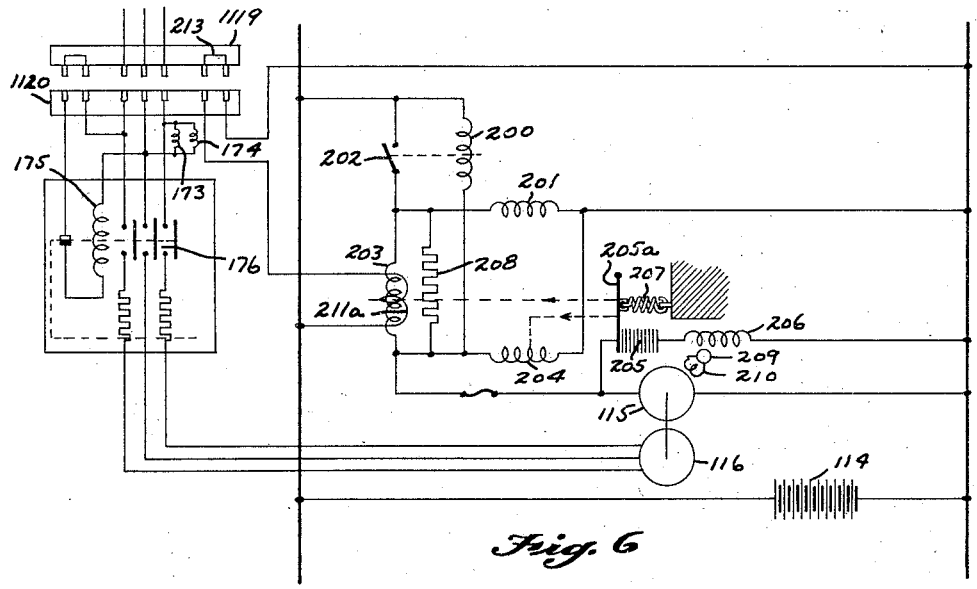

In Fig. 6 a slightly different method of energizing the coil 211a, which corresponds to coil 211 of Fig. 4, is provided. In this case the plug 1119 is provided with a jumper 213 which places the coil 211a across the battery when the plug 1119 is connected to the plug 1120.

Figure 7:
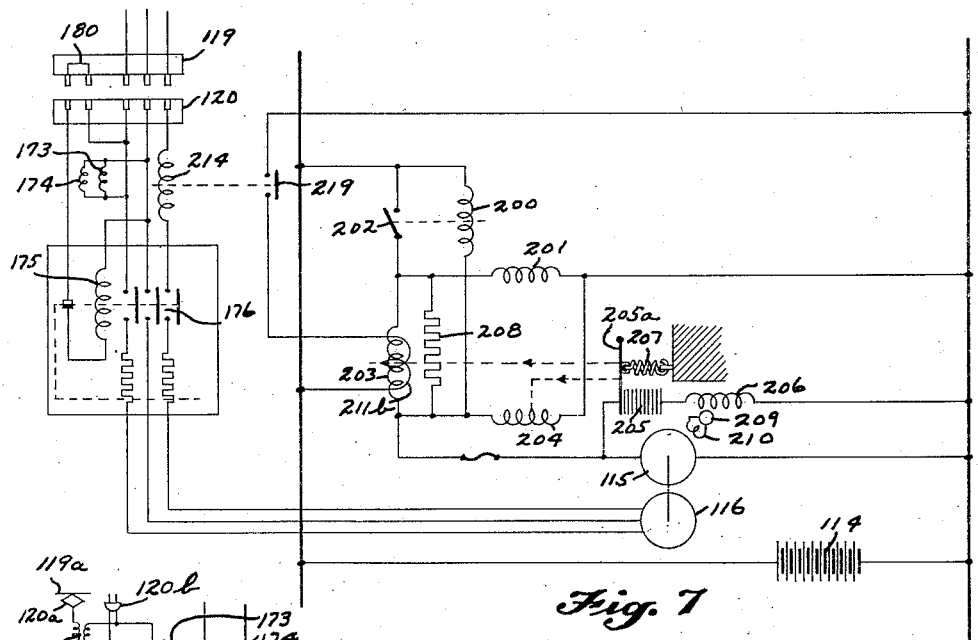

In the modification shown in Fig. 7, the biasing coil 211b, which corresponds to the coil 211 of Fig. 4, is energized by causing the current coil 214 to close the contacts 219, thus placing the coil 211b across the battery. The remaining portions of Figs. 6 and 7 are to be combined or substituted in the wiring diagram shown in Fig. 4, and the operation of the part is substantially the same.

Figure 8:
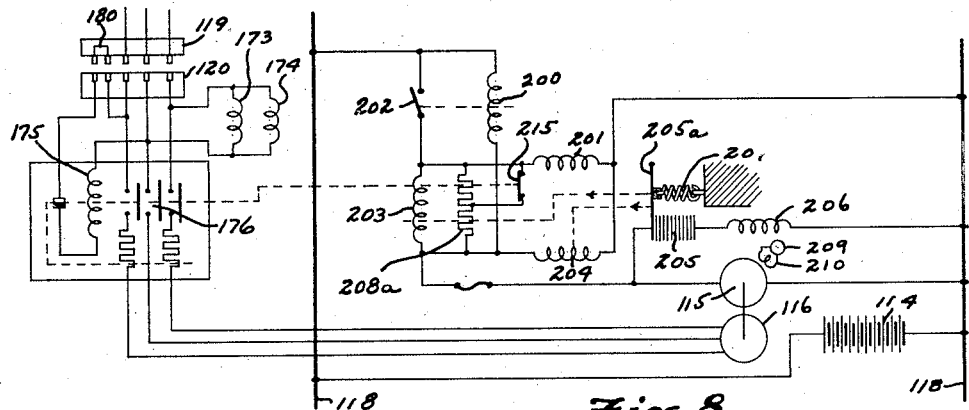

In Fig. 8, instead of providing a biasing coil similar to coil 211 of Fig. 4, the resistance 208a is made automatically adjustable, so that it is automatically altered whenever A. C. current is made available. Thus the switch 215 is automatically opened by the energization of the starter coil 175 when A. C. current is made available, and this places the entire portion of the coil 208a in parallel with the coil 203. This causes a greater proportion of current to flow through the coil 203 and hence increases the magnetic pull on the arm of the resistance 205. This weakens the field 206 and reduces the output of the generator 115 while it is being driven by the motor 116.

Figure 9:
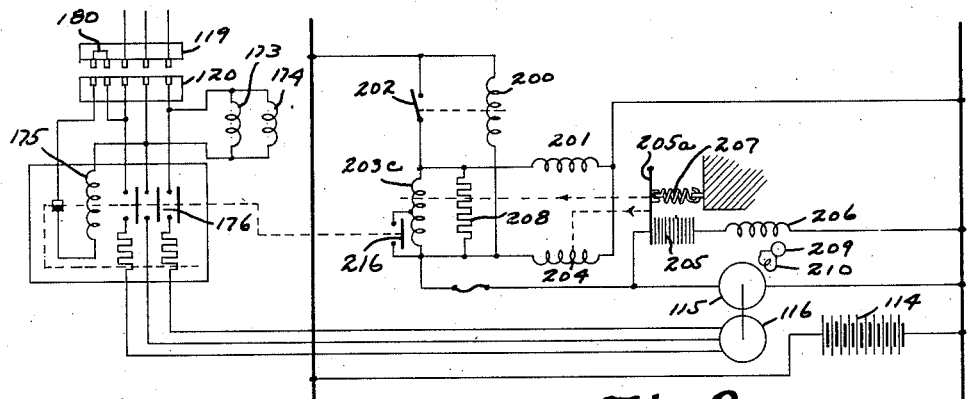

In Fig. 9, the coil 203c is modified directly when A. C. current is made available. Thus when the starter field 175 is energized, the contacts

4

216 are closed, thus shunting a portion of the coil 203c and increasing its pull on the resistance 205 to reduce the output of the generator 115 while being driven by the motor 116.

The motor 16 and motor-generator 12 may be combined in a single dynamoelectric machine having a single shaft. Likewise, the motor 116 and generator 115 may be combined in a single dynamoelectric machine having a single shaft.

Figure 10:
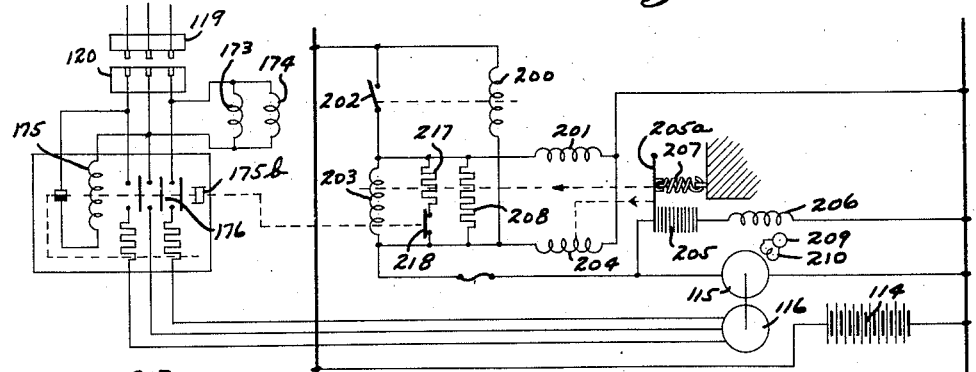
Figure 11:
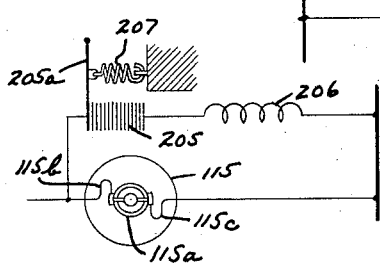

In the modification shown in Fig. 10, an additional resistance 217 is provided in parallel with the resistance 208. When the starter coil 175 is energized, the contacts 218 are opened thus decreasing the resistance which is in parallel with the coil 203. This increases the current flowing through the coil 203 to increase the resistance 205 as previously pointed out. In this modification, or in any of the preceding modifications of Figs. 4 to 9 inclusive, the jumper 180 may be omitted, and the starter coil 175 may be made responsive to current across the leads between the plug and the starter contacts without the use of the jumper. In such a case the motor starter may be provided with a time delay device, diagrammatically indicated at 175b.

Figure 5:
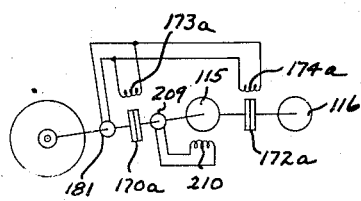
Fig. 5 is a detail of a modified form of clutch control.

In the modification shown in Fig. 5, the clutch 170a, between the axle and the generator 115a is controlled by solenoid 173a energized by a small generator 181 driven in proportion to car speed. The clutch 170a is automatically disengaged when the car stands or travels below a relatively low speed limit, such as 10 M. P. H., and is engaged at all speeds above that limit. The clutch 172a is controlled by the solenoid 174a to be engaged when the car stops or travels below some speed limit as 10 M. P. H. The remainder of the system is the same as in Figs. 3 and 4 except that the clutches 170 and 172 and solenoids 173 and 174 are replaced by the modified form of Fig. 5.

While the clutches have been indicated, in some instances, to be pneumatically controlled by the operation of solenoid valves, and have been indicated, in other instances, to be directly operated by the solenoid, it is to be understood that these forms may be used interchangeably or may be replaced by equivalent features. The clutch between the generator 115 and motor 116 may be omitted if desired. The clutch 170 may be a centrifugal, non-electric clutch, automatically disengaging below some car speed, such as 10 M. P. H. If a centrifugal clutch is used, the solenoid 173 may be omitted. The clutch 172, together with its solenoid control 174 or 174a may be omitted entirely, in which case the A. C. motor may be placed between the D. C. generator and the live axle assembly, or the A. C. motor and D. C. generator can be made into a unitary machine. The exciter 209 may be built in with the D. C. generator 115 as a unitary machine.

Fig. 11 shows the usual shiftable brush arrangement for a D. C. generator to cause the generator to charge the battery regardless of direction of rotation of the armature. Fig. 11 indicates how such an arrangement is fitted into the wiring diagrams of Figs. 3 to 10 inclusive, instead of the exciter circuit. The well known shiftable brush carriage 115a has its brushes connected to the flexible cables 115b and 115c which are connected to the generator leads for charging the battery. The carriage 115a automatically shifts the brushes with a change in rotation to maintain the direction of current constant. Sufficient parts of the wiring diagram of Figs. 3 to 10 are shown to indicate the substitution.

In Fig. 4, a voltage regulator 150 has been indicated to maintain a constant voltage supply to the fan motor 129, lights 151, etc. The lights are provided with switch control 152. The various motors may be provided with overload cutouts. Thus an overload switch 176a may be provided to protect motor 116, and an overload switch 60a may be provided for motor 16.

While the form of embodiment of the invention as herein disclosed, constitutes a preferred form, it is to be understood that other forms might be adopted, all coming within the scope of the claims which follow.

What is claimed is as follows:

1. In combination, a railway car or the like; an air conditioning system on said car and including a compressor; a condenser, and an evaporator in refrigerant flow relationship; a blower and blower motor, said blower circulating air in thermal exchange with said evaporator; a battery; a dynamoelectric assembly on said car including an A. C. motor and two D. C. dynamoelectric machines; means drivingly connecting one of said D. C. dynamoelectric machines to said compressor when A. C. current is not available, a connector for connecting a source of A. C. current independent of said car to said A. C. motor on said car, means drivingly connecting one of said D. C. dynamoelectric machines to said A. C. motor while A. C. current is supplied to said A. C. motor to generate D. C. energy to energize said blower motor and to charge said battery, means for driving said compressor by energy derived from said A. C. motor while A. C. current is available; means controlling the operation of said compressor in accordance with refrigeration conditions; said last named means including provisions for operating said A. C. motor and at least one of said D. C. dynamoelectric machines to energize said blower motor and to charge said battery independently of the operation of said compressor.

2. In combination, a railway car or the like; an air conditioning system on said car and including a compressor; condenser; and evaporator in refrigerant flow relationship; a blower and blower motor, said blower circulating air in thermal exchange with said evaporator; a battery; a first dynamoelectric machine connected to said battery and to an axle of said car; a second dynamoelectric machine connected to said compressor and to said battery, said first dynamoelectric machine arranged to energize said blower motor and to charge said battery while said car is enroute and said second dynamoelectric machine arranged to operate said compressor intermittently in response to air conditions while said car is enroute; a source of station electrical energy; a connector between said car and said source, and means on said car operable when said car is connected to said source by said connector to cause said blower motor to be continuously energized and said battery to be continuously charged and said compressor to be intermittently operated in response to air conditions by at least one of said dynamoelectric machines.

3. In combination, a railway car or the like; an air conditioning system on said car including a compressor, a condenser, and an evaporator in refrigerant flow relationship; a blower and blower motor, said blower circulating air in thermal exchange with said evaporator; an axle-driven D. C. generator, a battery and a compressor D. C. motor in electrical circuit with said blower motor; an A. C. motor on said vehicle, a source of A. C. current outside said car and available at various times, a connector for connecting said source of A. C. current to said A. C. motor; said D. C. generator charging said battery and energizing said motor while said car is enroute and said A. C. connector is not connected and provisions whereby said A. C. motor provides energy for driving the compressor motor intermittently in response to refrigeration demand and energizing said blower motor and for charging the battery independently of refrigeration demand when said connector is connected to said source of A. C. current.

4. In combination, a railway car or the like; an air conditioning system on said car including a compressor, a condenser, and an evaporator in refrigerant flow relationship; a blower and blower motor, said blower circulating air in thermal exchange with said evaporator; an axle-driven D. C. generator, a battery and a compressor D. C. motor in electrical circuit with said blower motor; an A. C. motor on said car drivingly connected to said D. C. generator, a source of A. C. current; a connector for connecting said source of A. C. current to said A. C. motor; and provisions whereby said D. C. motor drives said compressor intermittently in response to refrigeration demands, and said A. C. motor drives said D. C. generator independently of said axle and independently of refrigeration demands when said connector is connected to said source of A. C. current to energize said blower motor and to charge said battery.

5. In combination, a railway car or the like; an air conditioning system on said car including a compressor, a condenser, and an evaporator in refrigerant flow relationship; a blower and blower motor, said blower circulating air in thermal exchange with said evaporator; an axle-driven D. C. generator, a battery and a compressor D. C. motor in electrical circuit with said blower motor; an A. C. motor on said car drivingly connected to said D. C. generator, a source of A. C. current; a connector for connecting said source of A. C. current to said A. C. motor; provisions whereby said D. C. motor drives said compressor intermittently in response to refrigeration demands and said A. C. motor drives said D. C. generator independently of said axle and independently of refrigeration demands when said connector is connected to said source of A. C. current to energize said blower motor and to charge said battery and means modifying the output of said D. C. generator while being driven by said A. C. motor.

6. In combination, a railway car or the like; an air conditioning system on said car including a compressor, a condenser, and an evaporator in refrigerant flow relationship; a blower and blower motor, said blower circulating air in thermal exchange with said evaporator; an axle-driven D. C. generator, a battery and a compressor D. C. motor in electrical circuit with said blower motor; an A. C. motor on said car drivingly connected to said D. C. generator, a source of A. C. current; a connector for connecting said source of A. C. current to said A. C. motor; provisions whereby said D. C. motor drives said compressor intermittently in response to refrigeration demands and said A. C. motor drives said D. C. generator independently of said axle and independently of refrigeration demands when said connector is connected to said source of A. C. current to energize said blower motor and to charge said battery, voltage and current controlling means for said D. C. generator; and means modifying said voltage and current controlling means while said D. C. generator is driven by said A. C. motor.

7. In combination, a railway car or the like, an air conditioning system on said car including a compressor, a condenser, and an evaporator in refrigerant flow relationship; a blower and blower motor, said blower circulating air in thermal exchange with said evaporator; an axle-driven D. C. generator, a battery and a compressor D. C. motor in electrical circuit with said blower motor; an A. C. motor on said car drivingly connected to said D. C. generator; a source of A. C. current; a connector for connecting said source of A. C. current to said A. C. motor; provisions whereby said D. C. motor drives said compressor intermittently in response to refrigeration demands and said A. C. motor drives said D. C. generator independently of said axle and independently of refrigeration demands when said connector is connected to said source of A. C. current to energize said blower motor and to charge said battery, a field for said D. C. generator; coil means controlling the strength of said field to control the output of said D. C. generator while said D. C. generator is driven by said axle; and means modifying said coil means while said D. C. generator is driven by said A. C. motor.

8. In combination, a railway car or the like; an air conditioning system on said car and including a compressor; condenser; and evaporator in refrigerant flow relationship; a blower and blower motor, said blower circulating air in thermal exchange with said evaporator; a clutch; a motor-generator engageably and disengageably connected to said compressor by said clutch; a control instrument responsive to air conditions; an axle-driven generator; a battery energized by said generator; said control instrument arranged to engage said clutch and to cause said motor-generator, as a motor, to drive said compressor intermittently by energy derived from said generator and battery while said car is enroute; a source of A. C. electrical energy; an A. C. motor connected to said motor-generator; a connector between said source and said car; and means responsive to the connection of said car to said source by said connector to cause said A. C. motor to operate continuously and drive said motor-generator as a generator and to engage said clutch intermittently in response to air conditions, the arrangement being such as to drive said compressor intermittently in accordance with air conditions and to charge said battery and operate said blower motor independently of said intermittent compressor operation.

9. In combination, a railway car or the like; an air conditioning system on said car and including a compressor; condenser; and evaporator in refrigerant flow relationship; a blower and blower motor, said blower circulating air in thermal exchange with said evaporator; a clutch; a motor-generator engageably and disengageably connected to said compressor by said clutch; a control instrument responsive to air conditions; an axle-driven generator; a battery energized by said generator; means permanently to engage said clutch while said car is enroute; means to cause said control instrument to cause the operation of said motor-generator, as a motor, intermittently in response to air conditions while said car is enroute; a source of station electrical energy; a stand-by motor on said car connected to said motor-generator; a plug connector between said source and said car; means operative during the connection of said car to said source by said plug connector to cause said stand-by motor to operate continuously as long as station current is available and to drive said motor-generator as a generator to drive said blower motor and to charge said battery and to cause said control instrument to engage said clutch intermittently in response to air conditions, the arrangement being such as to drive said compressor intermittently in accordance with air conditions and to charge said battery and operate said blower motor independently of said intermittent compressor operation.

10. In combination, a railway car or the like; an air conditioning system on said car and including a compressor; condenser; and evaporator in refrigerant flow relationship; a blower and blower motor, said blower circulating air in thermal exchange with said evaporator; a battery; a first dynamoelectric machine connected to said battery and to an axle of said car; a second dynamoelectric machine connected to said compressor and to said battery, said first dynamoelectric machine arranged to energize said blower motor and to charge said battery while said car is enroute and said second dynamoelectric machine arranged to operate said compressor intermittently in response to air conditions while said car is enroute; a source of station electrical energy; a connector between said car and said source, and means on said car operable when said car is connected to said source for causing said blower motor to be continuously operated and said battery to be continuously charged and said compressor to be intermittently operated in response to air conditions by at least one of said dynamoelectric machines when said connector is connected to said source.

11. In combination, a railway car or the like; an air conditioning system on said car and including a compressor; condenser; and evaporator in refrigerant flow relationship; a blower and blower motor, said blower circulating air in thermal exchange with said evaporator; a battery; a first dynamoelectric machine on said car connected to said battery and to an axle of said car and including a D. C. generator and an A. C. motor; a second dynamoelectric machine including a motor connected to said compressor and to said battery; said first dynamoelectric machine arranged to energize said blower motor and to charge said battery while said car is enroute and said second dynamoelectric machine arranged to operate said compressor intermittently in response to air conditions while said car is enroute; a source of station electrical energy, a connector between said car and said source, a clutch between said axle and said first dynamoelectric machine engageable while said car is enroute and disengageable when said car stands; and means for operating said first dynamoelectric machine from said source to energize said blower motor, to charge said battery and intermittently to energize said second dynamoelectric machine and compressor.

ROBERT R. CANDOR.
DONALD F. ALEXANDER.